United States Patent [19]

Zupanovich et al.

[11] Patent Number: 4,561,897

[45] Date of Patent: Dec. 31, 1985

[54] AQUEOUS STABLE MAGNESIUM HYDROXIDE SUSPENSIONS WHICH ARE DISPERSIBLE IN OIL

[75] Inventors: John D. Zupanovich; John G. Myers, both of Pittsburgh, Pa.

[73] Assignee: Calgon Corporation, Pittsburgh, Pa.

[21] Appl. No.: 641,529

[22] Filed: Aug. 16, 1984

Related U.S. Application Data

[63] Continuation of Ser. No. 460,328, Jan. 24, 1983, abandoned.

[51] Int. Cl.$^4$ ................................................. C09K 3/00
[52] U.S. Cl. .............................. 106/14.14; 106/14.15; 106/14.21; 106/14.29; 106/14.44; 252/391; 252/395
[58] Field of Search ...................... 424/158; 106/14.13, 106/14.14, 14.15, 14.21, 14.29, 14.44; 252/391, 395

[56] References Cited

U.S. PATENT DOCUMENTS

| | | | |
|---|---|---|---|
| 3,957,674 | 5/1976 | Sano et al. | 252/182 |
| 4,129,515 | 12/1978 | Foster | 252/550 |
| 4,260,500 | 4/1981 | Forsberg | 252/33 |

*Primary Examiner*—Lorenzo B. Hayes
*Attorney, Agent, or Firm*—Michael C. Sudol, Jr.; R. Brent Olson; William C. Mitchell

[57] ABSTRACT

The instant invention is directed to an aqueous stable magnesium hydroxide suspension which is dispersible in oil, comprising a mixture of:

(a) a 33 to 60, preferably 50 to 60, percent, by weight, aqueous slurry or paste of magnesium hydroxide; and
(b) an alkyl benzene sulfonate emulsifier.

The instant invention is also directed to a process for the preparation of an aqueous stable magnesium hydroxide suspension which is dispersible in oil, comprising mixing:

(a) a 33 to 60, preferably 50 to 60, percent, by weight, aqueous slurry of magnesium hydroxide; and
(b) an alkyl benzene sulfonate emulsifier.

The instant invention is also directed to a process for inhibiting corrosion in fuel burning boilers comprising adding to the fuel a corrosion inhibiting amount of an aqueous stable magnesium hydroxide suspension which is dispersible in oil, comprising a mixture of:

(a) a 33 to 60 percent, by weight, aqueous slurry or paste of magnesium hydroxide; and
(b) an alkyl benzene sulfonate emulsifier.

10 Claims, No Drawings

AQUEOUS STABLE MAGNESIUM HYDROXIDE SUSPENSIONS WHICH ARE DISPERSIBLE IN OIL

This is a continuation of application Ser. No. 460,328, filed Jan. 24, 1983, now abandoned.

BACKGROUND OF THE INVENTION

Magnesium hydroxide is widely used in the chemical industry as the starting material for the preparation of magnesium sulfite in the magnefite process, as a neutralizing agent, as a gas absorber and in other utilities. It has recently attracted attention as a sulfurous acid gas absorber in flue gas as well as an additive to boilers using heavy oil for prevention of both high and low temperature corrosion. Magnesium hydroxide is transported in the form of a slurry, cake or dry powder. A disadvantage of aqueous slurries or pastes is that the solid content is normally 35 percent at the highest. This markedly increases the transportation cost. In addition, there is a high tendency towards sedimentation or separation during transportation. The form, therefore, is unsuitable for transportation. If the solid content of magnesium hydroxide is increased to over 35 percent, by weight, the viscosity is often 10,000 cp. or higher so that a cake with no fluidity is formed. Although transportation in this form may be possible, the handling of the cake is very inconvenient. Moreover, the reversion of the cake to a slurry, which is necessary for practical uses of magnesium hydroxide, requires a large amount of power and time due to the high viscosity of the cake.

Alternatively, magnesium hydroxide is often transported in dry powder. This is not satisfactory, however, since even if finely pulverized, the particles do not completely recover their original size. Moreover, aggregation of the particles and reduction in the surface activity will result in a higher tendency towards sedimentation and lower reactivity.

It is therefore desirable to transport magnesium hydroxide in slurry form, but with a concentration comparable to the cake, but with good fluidity and decreased sedimentation tendency.

Attempts which have been made by prior art techniques to prepare aqueous suspensions with a high concentration of magnesium hydroxide have not been successful. Consequently, means have been adopted to transport magnesium hydroxide in organic oily preparations at a high concentration by the addition of emulsifiers, surface active agents or protective colloid forming materials (U.S. Pat. No. 4,229,309). In these cases, however, special uses, such as a fuel additive, are only possible because of the extender being an organic oily substance. Moreover, these preparations are expensive.

The magnesium hydroxide that is obtained by reacting lightly calcined dolomite with salt water containing magnesium halogenides and of calcium chloride as the mother liquor is known to yield fluid aqueous suspensions of high concentration (cf. U.S. Pat. No. 3,451,774). This macrocrystalline magnesium hydroxide prepared by this special method has a lower water content, good fluidity of the suspension, and ready filterability, but readily forms sediment.

Colloidal magnesium hydroxide with low tendency of sedimentation can be produced under specialized reaction conditions, but it is difficult to filter and the solid concentration is low.

According to the present invention, the addition of a specific surface active agent to a magnesium hydroxide suspension in the concentration range which is normally a cake with no fluidity provides a highly fluid aqueous suspension which is very low in tendency towards sedimentation.

In the instant invention, an increase in solids requires less additive for viscosity and stability control.

U.S. Pat. No. 3,957,674 discloses the addition of sodium naphthalenesulfonate to magnesium hydroxide to form a suspension. Sodium dodecyl benzene sulfonate was found ineffective in the reference.

DESCRIPTION OF THE INVENTION

The instant invention is directed to an aqueous stable magnesium hydroxide suspension which is dispersible in oil, comprising a mixture of:
(a) a 33 to 60, preferably 50 to 60, percent, by weight, aqueous slurry or paste of magnesium hydroxide; and
(b) an alkyl benzene sulfonate emulsifier.

The instant invention is also directed to a process for the preparation of an aqueous stable magnesium hydroxide suspension which is dispersible in oil, comprising mixing:
(a) a 33 to 60, preferably 50 to 60, percent, by weight, aqueous slurry or paste of magnesium hydroxide; and
(b) an alkyl benzene sulfonate emulsifier.

The instant invention is also directed to a process for inhibiting corrosion in fuel burning boilers comprising adding to the fuel a corrosion inhibiting amount of an aqueous stable magnesium hydroxide suspension which is dispersible in oil, comprising a mixture of:
(a) a 33 to 60 percent, by weight, aqueous slurry or paste of magnesium hydroxide; and
(b) an alkyl benzene sulfonate emulsifier.

Magnesium hydroxide used in the invention may be obtained by conventional reactions such as treating sea water or salt water containing magnesium chloride with an alkali, for example, quick lime or lightly calcined dolomite.

Magnesium hydroxide normally remains in a slurry until concentrated to about 35 percent, by weight, and further concentration is possible by such a means as spontaneous sedimentation, filtration or centrifugal separation. Concentration to a higher degree is also possible by addition of dry powders to the slurry or, in the alternative, by the addition of water to the dry powders.

Any alkyl benzene sulfonate may be used. Examples include isopropylamine dodecyl benzene sulfonate, sodium dodecyl benzene sulfonate, ammonium dodecyl benzene sulfonate, triethanolamine dodecyl benzene sulfonate, tridecyl benzene sulfonic acid, dodecyl benzene sulfonic acid and the like.

The ratio of emulsifier to magnesium hydroxide slurry or paste is preferably 1:5 to 1:99, most preferably 1:14 to 1:98.5, by weight.

Antifoaming agents may also be added to the suspension to eliminate any foaming and to modify the viscosity. Examples include polydimethyl siloxane and polydimethyl siloxane with silica. Combustion catalysts may also be included, for example, cerium, manganese, iron, cobalt and copper as inorganic or organic compounds.

The suspension may be added to any fuel; for example, residual oil, black liquor and coal; to inhibit corrosion in fuel burning boilers. At least 0.1 ppm, preferably 0.1 to 200 ppm, is usually added to the fuel.

EXAMPLES

Example 1

To 285 grams of magnesium hydroxide at 57.5 percent active concentration, by weight, was added 15 grams of isopropylamine dodecyl benzene sulfonate. Additional slurries were prepared varying the percent of dispersant. The mixtures were blended with a mixer at low shear for five minutes. The resulting liquid dispersions were cooled to 25° C. and the viscosities measured by a Brookfield RVF viscometer using a No. 3 spindle at 20 RPM:

| Weight Percent Concentration of Dispersant | Viscosity |
| --- | --- |
| 5 | 1750 |
| 4.5 | 1000 |
| 4 | 450 |
| 3 | 325 |
| 2 | 350 |
| 1.5 | 800 |

The dispersions were still stable after nine months. No solid-liquid phase separation occurred during the nine-month period.

Example 2

To 284.7 grams of magnesium hydroxide at 57.5 percent active concentration, by weight, was added 15 grams of isopropylamine dodecyl benzene sulfonate and 0.3 grams of polydimethyl siloxane, an antifoaming agent. Additional slurries were prepared varying the percent of dispersant. The mixtures were blended with a mixer at low shear for five minutes. The liquid dispersions were cooled to 25° C. and the viscosities were measured by the method described in Example 1.

| Weight Percent Concentration of Dispersant | Percent Antifoam | Viscosity |
| --- | --- | --- |
| 5 | 0.1 | 2500 |
| 4.5 | 0.1 | 1300 |
| 4 | 0.1 | 450 |

The dispersions were still stable after three months.

Example 3

To 285 grams of magnesium hydroxide at 57.5 percent active concentration, by weight, was added 15 grams of isopropylamine dodecylbenzene sulfonate and 3.77 grams of cerium hydroxide. The mixture was blended with a mixer at low shear for five minutes. The resulting liquid dispersion was cooled to 25° C. The dispersion was still stable after three months.

Example 4

To 282 grams of magnesium hydroxide at 57.5 percent active concentration, by weight, was added 18 grams of isopropylamine dodecyl benzene sulfonate. The mixture was blended with a mixer at low shear for five minutes. To this liquid dispersion was added 6.9 grams of organometallic manganese compound. The mixture was remixed for three minutes to uniformly disperse the organometallic manganese. The dispersion was then cooled at 25° C. The dispersion was still stable after three months.

Example 5

To 285 grams of magnesium hydroxide cake at 50 percent active concentration, by weight, was added 15 grams of sodium dodecyl benzene sulfonate. Additional slurries were prepared varying the percent of dispersant. The mixtures were shaken by means of a wrist shaker for one minute. The viscosities of the original pastes were reduced to ≦25 centipoise. The viscosities were measured by the method described in Example 1:

| Weight Percent Concentration of Dispersant | Viscosity |
| --- | --- |
| 7 | 2300 |
| 6 | 500 |
| 5 | 125 |

The dispersions were still stable after three months.

What is claimed is:

1. An aqueous stable magnesium hydroxide suspension having a viscosity of not more than 2500 centipoise as measured by a Brookfield RVF Viscometer at 25° C., which is dispersible in oil, consisting essentially of a mixture of:
    (a) a 33 to 60 percent, by weight, aqueous slurry or paste of magnesium hydroxide; and
    (b) at least 1 percent, by weight, based on the weight of said slurry or paste, of an alkyl benzene sulfonate emulsifier.

2. The suspension of claim 1, wherein at 50 to 60 percent, by weight, aqueous slurry or paste of magnesium hydroxide is used.

3. The suspension of claim 1, wherein said alkyl benzene sulfonate emulsifier is selected from the group consisting of isopropylamine dodecyl benzene sulfonate, sodium dodecyl benzene sulfonate, ammonium dodecyl benzene sulfonate, triethanolamine dodecyl benzene sulfonate, tridecyl benzene sulfonic acid, and dodecyl benzene sulfonic acid.

4. The suspension of claim 1, wherein the ratio of said emulsifer to said magnesium hydroxide slurry or paste is 1:5 to 1:99, by weight.

5. A process for the preparation of an aqueous stable magnesium hydroxide suspension having a viscosity of not more than 2500 centipoise as measured by a Brookfield RVF Viscometer at 25° C., which is dispersible in oil, consisting essentially of mixing:
    (a) a 33 to 60 percent, by weight, aqueous slurry or paste of magnesium hydroxide; and
    (b) at least 1 percent, by weight, based on the weight of said slurry or paste, of an alkyl benzene sulfonate emulsifier.

6. The process of claim 5, wherein a 50 to 60 percent, by weight, aqueous slurry or paste of magnesium hydroxide is used.

7. the process of claim 5, wherein said alkyl benzene sulfonate emulsifier is selected from the group consisting of isopropylamine dodecyl benzene sulfonate, sodium dodecyl benzene sulfonate, ammonium dodecyl benzene sulfonate, triethanolamine dodecyl benzene sulfonate, tridecyl benzene sulfonic acid, and dodecyl benzene sulfonic acid.

8. The process of claim 5, wherein the ratio of said emulsifier to said magnesium hydroxide slurry or paste is 1:5 to 1:99, by weight.

9. An aqueous stable magnesium hydroxide suspension having a viscosity of not more than 2500 centipoise as measured by a Brookfield RVF Viscometer at 25° C., which is dispersible in oil, consisting essentially of a mixture of:
 (a) a 33 to 60 percent, by weight, aqueous slurry or paste of magnesium hydroxide;
 (b) at lease 1 percent, by weight, based on the weight of said slurry or paste, or an alkyl benzene sulfonate emulsifier;
 (c) antifoaming agents; and
 (d) combustion catalysts.

10. A process for the preparation of an aqueous stable magnesium hydroxide suspension having a viscosity of not more than 2500 centipoise as measured by a Brookfield RVF Viscometer using a No. 3 spindle at 20 rpm at 25° C., which is dispersible in oil, consisting essentially of mixing:
 (a) a 33 to 60 percent, by weight, aqueous slurry or paste of magnesium hydroxide;
 (b) at lease 1 percent, by weight, based on the weight of said slurry or paste, or an alkyl benzene sulfonate emulsifier;
 (c) antifoaming agents; and
 (d) combustion catalysts.

* * * * *